(12) United States Patent
Swinkels et al.

(10) Patent No.: US 12,586,800 B2
(45) Date of Patent: Mar. 24, 2026

(54) HYDROGEN GENERATION ELECTRICITY SYSTEM FOR PRODUCING ELECTRICITY FROM HYDROGEN USING A HYDROGEN CARRIER SUBSTANCE AND A METHOD FOR OPERATING THE HYDROGEN GENERATION ELECTRICITY SYSTEM

(71) Applicant: DENS B.V., Helmond (NL)

(72) Inventors: Martinus Arnoldus Petrus Maria Swinkels, Helmond (NL); Max Joannes Robertus Aerts, Helmond (NL)

(73) Assignee: DENS B.V., Helmond (NL)

( * ) Notice: Subject to any disclaimer, the term of this patent is extended or adjusted under 35 U.S.C. 154(b) by 597 days.

(21) Appl. No.: 18/012,429

(22) PCT Filed: Jun. 22, 2021

(86) PCT No.: PCT/EP2021/067024
§ 371 (c)(1),
(2) Date: Dec. 22, 2022

(87) PCT Pub. No.: WO2021/259941
PCT Pub. Date: Dec. 30, 2021

(65) Prior Publication Data
US 2023/0268532 A1 Aug. 24, 2023

(30) Foreign Application Priority Data

Jun. 23, 2020 (EP) ..................................... 20181731

(51) Int. Cl.
*H01M 8/04* (2016.01)
*H01M 8/04119* (2016.01)
(Continued)

(52) U.S. Cl.
CPC ... *H01M 8/04835* (2013.01); *H01M 8/04126* (2013.01); *H01M 8/045* (2013.01);
(Continued)

(58) Field of Classification Search
CPC ......... H01M 8/04835; H01M 8/04126; H01M 8/045; H01M 8/04738; H01M 8/04776; H01M 8/0625
(Continued)

(56) References Cited

U.S. PATENT DOCUMENTS

2003/0224230 A1* 12/2003 Stocker ............. H01M 8/04589
429/420
2010/0227232 A1 9/2010 Xiao
(Continued)

FOREIGN PATENT DOCUMENTS

JP 2006032236 A 2/2006
JP 2018118877 A 8/2018
WO WO-2013027456 A1 * 2/2013 ........ H01M 8/04835

OTHER PUBLICATIONS

Celaje et al. A prolific catalyst for dehydrogenation of neat formic acid. Nature Communications, 2016, pp. 1-6. Retrieved from https://pubmed.ncbi.nlm.nih.gov/27076111/ (Year: 2016).*
(Continued)

*Primary Examiner* — James M Erwin
(74) *Attorney, Agent, or Firm* — MH2 Technology Law Group, LLP

(57) ABSTRACT
A hydrogen generation electricity system for producing electricity from hydrogen using a hydrogen carrier substance, comprising: a reaction chamber arranged for generating a H2 gas stream by converting the hydrogen carrier substance; wherein the reaction chamber comprises an inlet arranged for receiving the hydrogen carrier substance; an output conduit for exiting the H2 gas stream; a fuel cell
(Continued)

arranged for producing electric energy by converting hydrogen; the output conduit is arranged for supplying the H2 gas stream from the reaction chamber to the fuel cell; the system further comprising: a humidity determining unit arranged for determining a humidity level of the H2 gas stream; a water providing means for providing H2O to the reaction chamber; and a water vapour control means arranged for controlling the water vapour level in the reaction chamber, in response to the determined humidity level, wherein the generated H2 gas stream comprises hydrogen and water vapour.

20 Claims, 3 Drawing Sheets

(51) Int. Cl.

| | | |
|---|---|---|
| *H01M 8/04492* | (2016.01) | |
| *H01M 8/04701* | (2016.01) | |
| *H01M 8/04746* | (2016.01) | |
| *H01M 8/04828* | (2016.01) | |
| *H01M 8/0612* | (2016.01) | |

(52) U.S. Cl.
CPC ... *H01M 8/04738* (2013.01); *H01M 8/04776* (2013.01); *H01M 8/0625* (2013.01)

(58) Field of Classification Search
USPC ......................................................... 429/413
See application file for complete search history.

(56) References Cited

U.S. PATENT DOCUMENTS

| | | | |
|---|---|---|---|
| 2010/0273082 A1 | 10/2010 | Ballantine | |
| 2011/0059378 A1 | 3/2011 | Chan | |
| 2011/0196776 A1 | 8/2011 | Rash | |
| 2013/0052549 A1* | 2/2013 | Mizuhata | H01M 8/0668 |
| | | | 429/412 |
| 2013/0180862 A1* | 7/2013 | Yoshida | C01B 13/0207 |
| | | | 204/242 |
| 2016/0365589 A1* | 12/2016 | Iftime | C01B 3/065 |
| 2018/0047997 A1* | 2/2018 | Imamura | C23C 28/04 |

OTHER PUBLICATIONS

Akiya et al. Role of Water in Formic Acid Decomposition. AlChE Journal, vol. 44, No. 2, 1998, p. 405*415. Retrieved from https://aiche.onlinelibrary.wiley.com/doi/10.1002/aic.690440217 (Year: 1998).*

\* cited by examiner

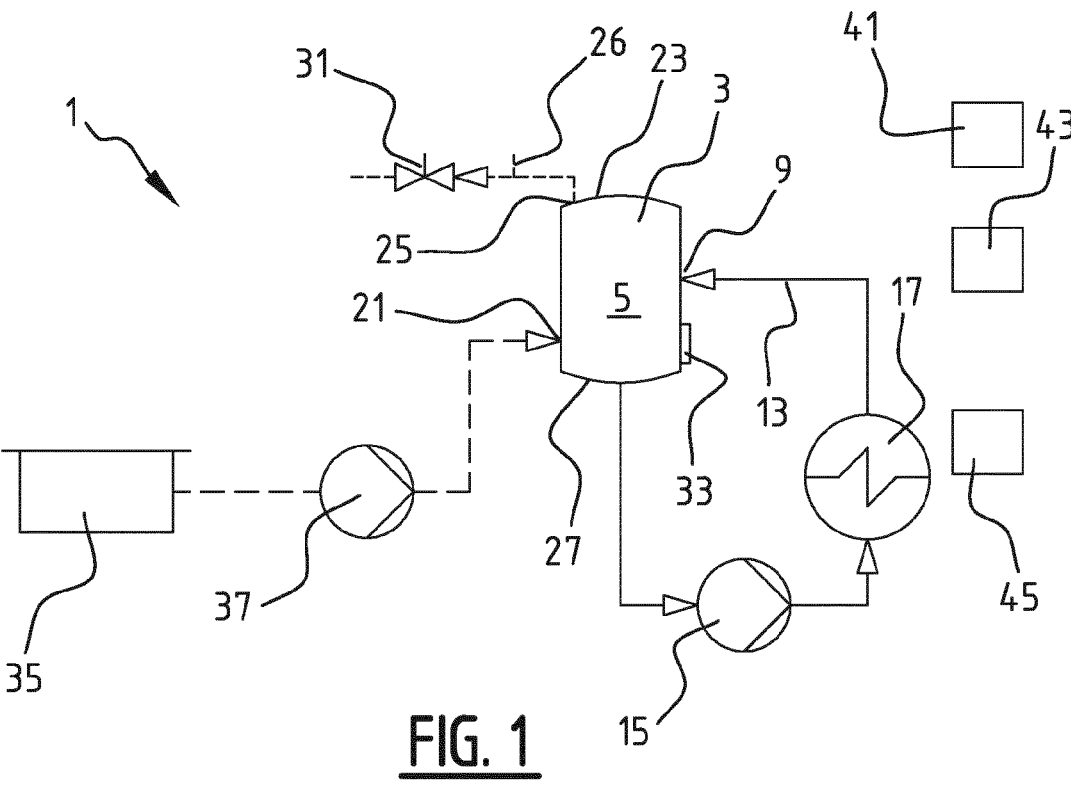
FIG. 1
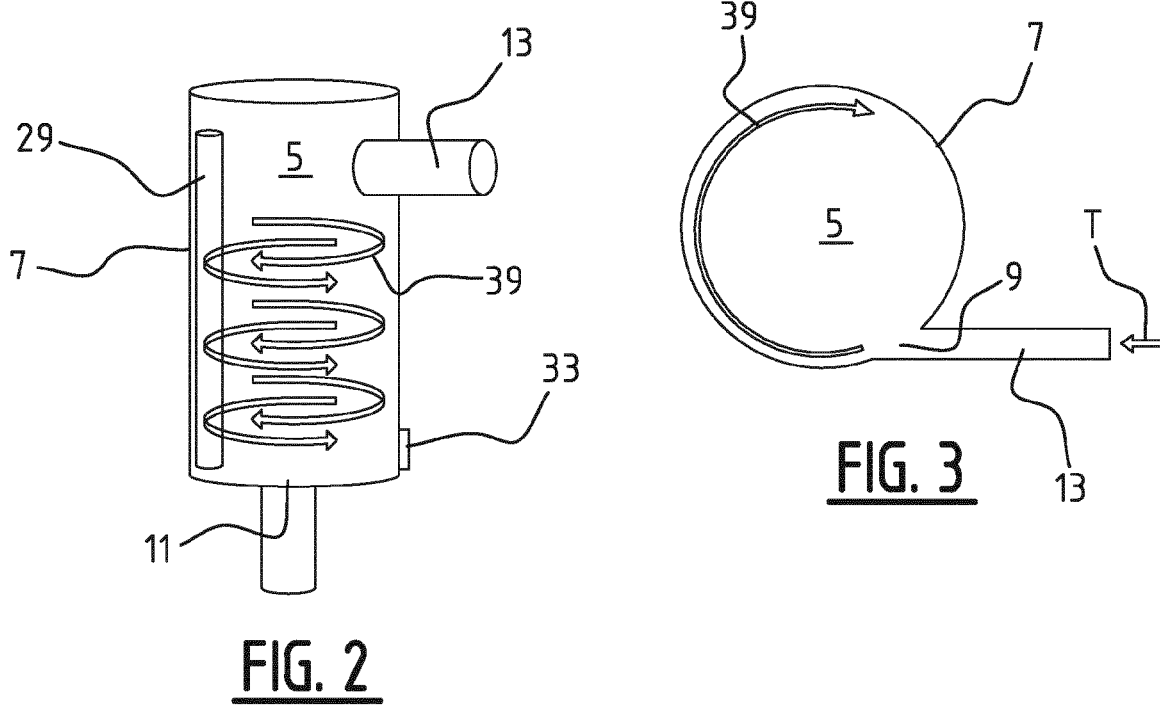
FIG. 2
FIG. 3

HYDROGEN GENERATION ELECTRICITY SYSTEM FOR PRODUCING ELECTRICITY FROM HYDROGEN USING A HYDROGEN CARRIER SUBSTANCE AND A METHOD FOR OPERATING THE HYDROGEN GENERATION ELECTRICITY SYSTEM

FIELD OF INVENTION

The field of the invention relates to a hydrogen generation electricity system for producing electricity from hydrogen using a hydrogen carrier substance. The field of the invention further relates to a method for operating the hydrogen generation electricity system according to the invention.

BACKGROUND

A hydrogen generation electricity system for producing hydrogen using a hydrogen carrier substance is generally known. The hydrogen carrier substance may be a liquid hydrogen carrier substance, such as methanol and formic acid. The hydrogen generation system comprises a carrier reservoir for storing the hydrogen carrier substance, a reaction chamber arranged for generating a $H_2$ gas stream by converting the hydrogen carrier substance, wherein the $H_2$ gas stream comprises hydrogen. The reaction chamber comprises an inlet arranged for receiving the hydrogen carrier substance from the carrier reservoir. The system further comprises an output conduit for exiting the $H_2$ gas stream from the reaction chamber. In case of converting formic acid in the reaction chamber a $H_2$ gas stream is produced, which contains hydrogen gas and carbon dioxide gas.

Optionally, the output conduit of the hydrogen generation system may be directly coupled to a fuel cell. The fuel cell is arranged to produce electric energy by converting hydrogen. The output conduit supplies the $H_2$ gas stream from the reaction chamber to the fuel cell.

In general, a fuel cell demands a certain desired humidity level inside for operating effectively. The fuel cell produces electricity while forming water by converting the hydrogen gas and additional oxygen gas inside the fuel cell according to the reaction scheme $H_2+2O_2->2\ H_2O$. The output (gas) stream of the fuel cell contains water in a vapour phase, which output gas stream is (at least partly) used and transported back to the inlet of the fuel cell to maintain the humidity level inside the fuel cell at the desired humidity level. The output gas stream in general additionally contains remaining hydrogen and/or oxygen, which were not converted inside the fuel cell. The vapour content from the output gas stream needs to be separated from any remaining hydrogen and/or oxygen in the output gas stream before the vapour can be introduced into the fuel cell. In order to separate the vapour a NAFION membrane is used, which is a relatively expensive element. Additionally, a control on the vapour transport flow rate via the NAFION membrane to the fuel cell is limited.

Moreover, a desire exists to provide a system for producing electricity from hydrogen using a hydrogen carrier substance, which system enables an easy control of both a hydrogen content and a water (or vapour) level of a gas stream.

SUMMARY

According to a first aspect of the invention there is provided a hydrogen generation electricity system for producing electricity from hydrogen using a hydrogen carrier substance, the system comprising:

a reaction chamber arranged for generating a $H_2$ gas stream by converting the hydrogen carrier substance;

wherein the reaction chamber comprises an inlet arranged for receiving the hydrogen carrier substance;

an output conduit for exiting the $H_2$ gas stream from the reaction chamber;

a fuel cell arranged for producing electric energy by converting hydrogen;

and the output conduit is arranged for supplying the $H_2$ gas stream from the reaction chamber to the fuel cell;

the system further comprising a humidity determining unit arranged for determining a humidity level of the $H_2$ gas stream;

a water providing means for providing $H_2O$ to the reaction chamber; and water vapour control means arranged for controlling the water vapour level in the reaction chamber, in response to the determined humidity level, and wherein the generated $H_2$ gas stream comprises hydrogen and water vapour.

According to another aspect of the invention there is provided a method for operating a hydrogen generation electricity system according to the invention, the method comprising the steps:

receiving in a reaction chamber a hydrogen carrier substance;

receiving water in the reaction chamber;

the reaction chamber generating a $H_2$ gas stream by converting the hydrogen carrier substance, wherein the $H_2$ gas stream comprises hydrogen and water vapour;

a humidity determining unit determining a humidity level of the $H_2$ gas stream;

a water vapour control means controlling, in response to the determined humidity level, the water vapour level inside the reaction chamber;

a fuel cell producing electric energy by converting hydrogen, which is supplied by the $H_2$ gas stream to the fuel cell.

The hydrogen generation electricity system of the invention has the advantage that a $H_2$ gas stream may be produced by the system containing hydrogen and a suitably controlled water vapour concentration for a fuel cell. The water vapour concentration may be suitably controlled by the hydrogen generation system to be within a target vapour concentration range. The hydrogen generation system controls the formation of hydrogen by converting the hydrogen carrier substance and thereby may control the hydrogen concentration of the $H_2$ gas stream. Water is provided inside the reaction chamber by the water providing means. The water vapour control means is arranged for controlling the water vapour level in the reaction chamber, in response to the determined humidity level. The water vapour level in the reaction chamber determines the humidity level of the $H_2$ gas stream.

In embodiments, the water vapour control means controls the water vapour concentration of the $H_2$ gas stream by suitably controlling at least one of an internal gas pressure of the reaction chamber and a reaction temperature of the reaction chamber. The internal gas pressure of the reaction chamber and a reaction temperature of the reaction chamber affect an evaporation process of the water inside the reaction chamber, thereby controlling the water vapour concentration of the $H_2$ gas stream, which exits the reaction chamber. The reaction temperature is the temperature inside the reaction chamber where the hydrogen gas is formed.

In an embodiment, the water vapour control means is arranged for controlling the humidity level of the $H_2$ stream to be within a target vapour concentration range. In a preferred embodiment, the target vapour concentration range is selected for a fuel cell.

In an embodiment, the hydrogen carrier substance is liquid at room temperature.

In a particular embodiment, the hydrogen carrier substance is selected from formic acid and methanol and mixtures thereof. In a preferred embodiment, the hydrogen carrier substance is formic acid.

In an embodiment, the hydrogen generation system further comprises a fuel cell arranged for producing electric energy by converting hydrogen; and the output conduit is arranged for supplying the $H_2$ gas stream from the reaction chamber to the fuel cell.

In an embodiment, the water vapour control means comprises at least one of:

a pressure control unit for controlling the internal gas pressure of the reaction chamber; and a temperature control unit for controlling the reaction temperature of the reaction chamber.

In an embodiment, the water vapour control means comprises a central control unit to control said at least one of a pressure control unit and a temperature control unit.

In an embodiment, the pressure control unit comprises a pressure valve arranged at the output conduit of the $H_2$ gas stream to control the internal gas pressure of the reaction chamber.

In an embodiment, the water providing means comprises at least one of:

a gas supply unit arranged for providing a gas stream comprising water vapour to the reaction chamber;

a water supply unit arranged for providing a liquid stream comprising water to the reaction chamber; and wherein the system comprises a carrier reservoir for storing a hydrogen carrier composition comprising the hydrogen carrier substance and water, wherein the inlet of the reaction chamber is arranged for receiving the hydrogen carrier composition including water from the carrier reservoir.

In a particular embodiment, as water providing means a combination is used of at least two of the gas supply unit, the water supply unit and a hydrogen carrier composition arranged inside the carrier reservoir which comprises an amount of water in addition to the hydrogen carrier substance.

In an embodiment, wherein the hydrogen carrier substance is liquid at room temperature, the water vapour control means is arranged for controlling a surface level of the reaction mixture inside the reaction chamber. In particular, the water vapour control means controls the surface level of the reaction mixture to maintain the surface level within a predetermined height range. In this way, an overflowing of the reaction chamber may be prevented. The water vapour control means may select at least one of the internal gas pressure of the reaction chamber and the reaction temperature of the reaction chamber to maintain the surface level within a predetermined height range.

In an embodiment, the $H_2$ gas stream comprises hydrogen and water vapour. The $H_2$ gas stream may additionally contain other reaction products. In an example, when formic acid is converted additionally carbon dioxide is formed, which exits the reaction chamber in the $H_2$ gas stream.

In an embodiment, the humidity determining unit comprises at least one of:

a sensor arranged at the output conduit of the $H_2$ stream; and a level sensor unit arranged for sensing a surface level of a liquid reaction mixture comprising the hydrogen carrier substance inside the reaction chamber, wherein the humidity determining unit is arranged to calculate the humidity level based on the measured surface level.

The liquid reaction mixture contains the hydrogen carrier substance and water. In a specific example, the liquid reaction mixture may further contain a catalyst for catalyzing the conversion reaction of the hydrogen carrier substance.

In an example, the humidity determining unit may determine the humidity level based on a known supply of liquid hydrogen carrier substance and water to the reaction chamber, while the surface level is substantially held constant.

In another example, the humidity determining unit may determine the humidity level based on a known outflow rate of $H_2$ gas stream having hydrogen gas including water vapour from the reaction chamber, while the surface level is substantially held constant.

In an embodiment, the humidity determining unit is arranged to provide a signal for indicating the humidity level to the water vapour control means.

In an embodiment, the system comprises a carrier reservoir for storing the hydrogen carrier substance, wherein the inlet of the reaction chamber is arranged for receiving the hydrogen carrier substance from the carrier reservoir.

In an embodiment, the hydrogen carrier substance has a freezing temperature between 0 and 20 degrees Celsius. Preferably the hydrogen carrier substance is formic acid.

In a particular embodiment, the hydrogen generation system further comprises a freezing control unit for controlling a water supply to the carrier reservoir in response to a measured ambient temperature.

In an embodiment, the hydrogen generation system further comprises a conduit for delivering the water supply to the carrier reservoir.

In an embodiment, the hydrogen generation system further comprises a temperature sensor arranged for measuring the ambient temperature.

In an embodiment, the hydrogen generation system further comprises a water concentration determining unit for determining a water concentration of a hydrogen carrier composition containing the hydrogen carrier substance and an amount of water in the carrier reservoir.

In an embodiment, the water concentration determining unit may be a sensor for sensing the water concentration of the hydrogen carrier composition, and may be an input device for receiving a signal indicating the water concentration of the hydrogen carrier composition, such as by an input signal provided by an operator of the system.

In an embodiment, the water vapour controlling step comprises controlling at least one of an internal gas pressure of the reaction chamber and a reaction temperature of the reaction chamber in order to control the humidity level of the $H_2$ gas stream.

In an embodiment, the water vapour control means controls the humidity level of the $H_2$ gas stream to be within a target vapour concentration range.

In an embodiment, the target vapour concentration range is a dew point range from −70 degrees Celsius to 100 degrees Celsius at 1 bar. Preferably, the target vapour concentration range is a dew point range from 0 degrees Celsius to 80 degrees Celsius at 1 bar, more preferably from 30 degrees Celsius to 60 degrees Celsius at 1 bar.

In an embodiment, the hydrogen generation system further comprises a fuel cell, the method further comprising the step of the fuel cell producing electric energy by converting hydrogen, which is supplied by the $H_2$ gas stream to the fuel cell.

In an embodiment, wherein, in case a humidity level of the $H_2$ gas stream is lower than the target vapour concentration range, an internal gas pressure is decreased and/or a reaction temperature is increased, and wherein, in case a humidity level of the $H_2$ stream is higher than the target vapour concentration range, the internal gas pressure is increased and/or the reaction temperature is decreased.

In an embodiment, the temperature of the $H_2$ gas stream supplied to a fuel cell is maintained above the Dew point level of the $H_2$ gas stream during transport to the fuel cell. This prevents any loss of water vapour during the transport to the fuel cell.

In an embodiment, said reaction mixture is an aqueous solution comprising a formate salt.

In an embodiment, the reaction mixture additionally comprises a catalyst.

In a particular embodiment, said catalyst comprises a complex of the formula:

$$M(L)_n \qquad \text{(I)}$$

in which,

M is a metal selected from Ru, Rh, Ir, Pt, Pd, and Os, preferably Ru;

n is in the range of 1-4;

L is a carbene, or a ligand comprising at least one phosphorus atom, said phosphor atom being bound by a complex bond to said metal, the phosphorus ligand further comprising at least an aromatic group and a hydrophilic group, wherein, if n>1, each L may be different from another L;

wherein the complex of formula (I) optionally comprises other ligands and is provided in the form of a salt or is neutral.

In embodiments a reaction temperature range of the reaction chamber is 20-200 degrees Celsius and/or the internal pressure in said reaction chamber is in the range of 1-1200 bar. Preferably, said reaction temperature range is 40-150 degrees Celsius.

Preferably, a partial pressure of said hydrogen is in the range of 0.5-600 bar.

Optionally, a partial pressure of carbon dioxide is in the range of 0.5-600 bar.

Preferably, a total internal gas pressure of the reaction chamber is in the range of 0.1-16 bar.

In another aspect of the invention a hydrogen generation system is provided for producing hydrogen using a hydrogen carrier substance, the system comprising:

a reaction chamber arranged for generating a $H_2$ gas stream by converting the hydrogen carrier substance;

wherein the reaction chamber comprises an inlet arranged for receiving the hydrogen carrier substance;

an output conduit for exiting the $H_2$ gas stream from the reaction chamber;

the system further comprising a humidity determining unit arranged for determining a humidity level of the $H_2$ gas stream;

a water providing means for providing $H_2O$ to the reaction chamber; and a water vapour control means arranged for controlling, in response to the determined humidity level, the water vapour level inside the reaction chamber, wherein the generated $H_2$ gas stream comprises hydrogen and water vapour and wherein the $H_2$ gas stream is suitable for fueling a fuel cell.

In another aspect of the invention a method is provided for operating an hydrogen generation system according to the invention, the method comprising the steps:

receiving in a reaction chamber a hydrogen carrier substance;

receiving water in the reaction chamber;

the reaction chamber generating a $H_2$ gas stream by converting the hydrogen carrier substance, wherein the $H_2$ gas stream comprises hydrogen and water vapour;

a humidity determining unit determining a humidity level of the $H_2$ gas stream;

a water vapour control means controlling, in response to the determined humidity level, the water vapour level inside the reaction chamber, wherein the $H_2$ gas stream is suitable for fueling a fuel cell.

In another aspect of the disclosure a hydrogen generation system is provided for producing hydrogen using a hydrogen carrier substance, the system comprising:

a carrier reservoir for storing the hydrogen carrier substance;

a reaction chamber arranged for generating a $H_2$ gas stream by converting the hydrogen carrier substance, wherein the $H_2$ gas stream comprises hydrogen, wherein the reaction chamber comprises an inlet arranged for receiving the hydrogen carrier substance from the carrier reservoir;

an output conduit for exiting the $H_2$ gas stream from the reaction chamber;

the system further comprising:

a water supplying means for supplying $H_2O$ to the carrier reservoir; and a freezing control unit arranged for controlling the supply of water by the water supplying means to the carrier reservoir in response to a measured ambient temperature.

The freezing control unit controls the supply of water by the water supplying means to the carrier reservoir in order to prevent or limit a freezing of the hydrogen carrier substance inside the carrier reservoir. In case a measured ambient temperature decreases, such as below a predetermined threshold, the freezing control unit may control the supply of water by the water supplying means to the carrier reservoir in order to increase a water concentration of a hydrogen carrier composition containing the hydrogen carrier substance and water. Preferably, the hydrogen carrier substance and water form a homogeneous mixture.

In embodiments, the hydrogen carrier substance has a freezing temperature between 0 and 20 degrees Celsius. Preferably the hydrogen carrier substance is formic acid.

In a particular embodiment, the hydrogen generation system further comprises a freezing control unit for controlling a water supply to the carrier reservoir in response to a measured ambient temperature.

In an embodiment, the hydrogen generation system further comprises a conduit for delivering the water supply to the carrier reservoir.

In an embodiment, the hydrogen generation system further comprises a temperature sensor arranged for measuring the ambient temperature.

In an embodiment, the hydrogen generation system further comprises a water concentration determining unit for determining a water concentration of a hydrogen carrier composition containing the hydrogen carrier substance and an amount of water in the carrier reservoir.

In an embodiment, the water concentration determining unit may be a sensor for sensing the water concentration of the hydrogen carrier composition, and may be an input device for receiving a signal indicating the water concentration of the hydrogen carrier composition, such as by an input signal provided by an operator of the system.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIG. 1: a system according to the present disclosure is shown;

FIG. 2: an element of the system from FIG. 1 is shown;

FIG. 3: a top view of an element of the system from FIG. 1 is shown;

DESCRIPTION OF EMBODIMENTS

Figure 4A:
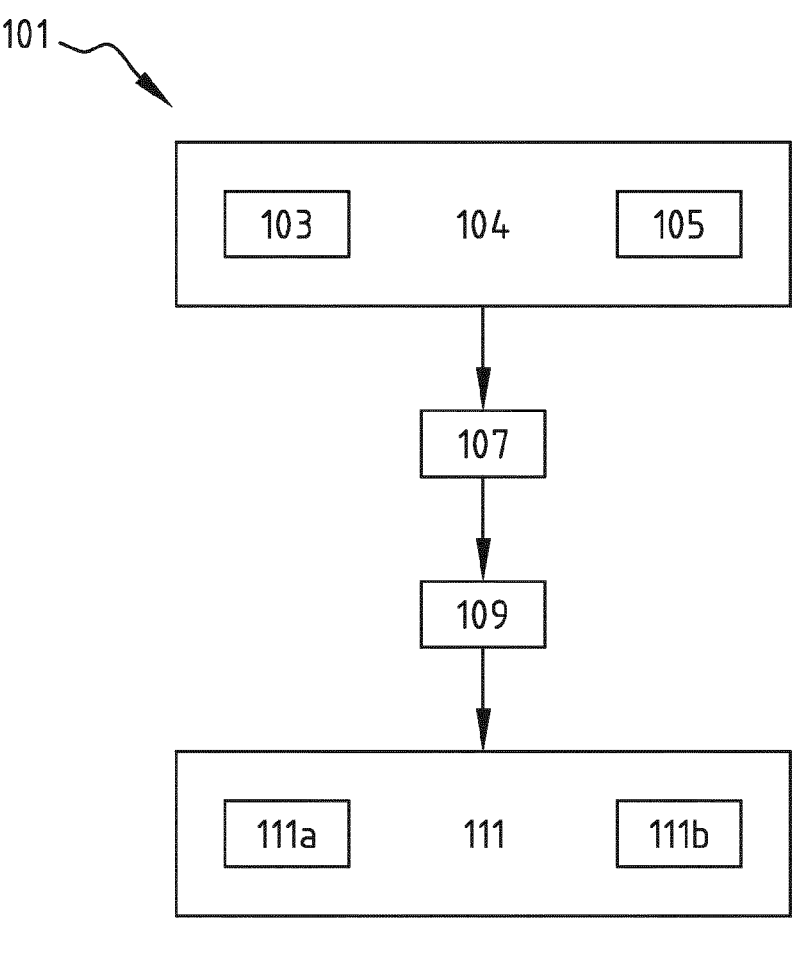
FIGS. 4A and 4B: a method according to the present disclosure is shown.
Figure 4B:
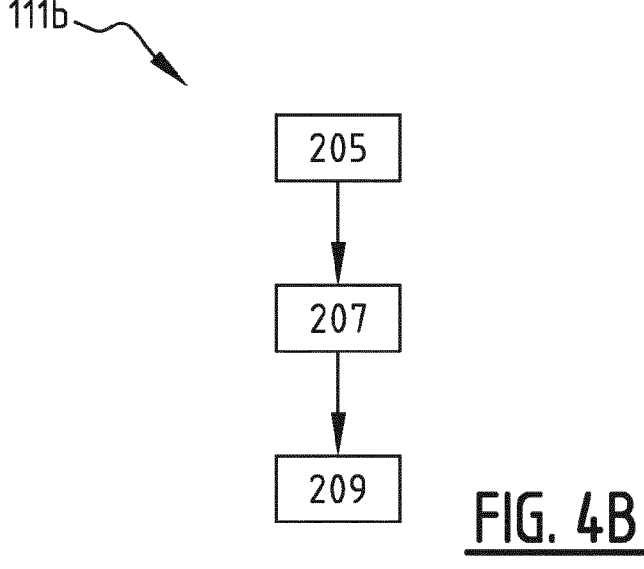

System 1 is arranged for producing hydrogen by dehydrogenation of formic acid. The system 1 comprises a reactor vessel 3, an inflow conduit 13, a pump 15 and a temperature control arrangement 17. The reactor vessel 3 comprises a reaction chamber 5 that is bound by a reactor wall 7. The reactor wall 7 comprises a lower side wall 27 and an upper side wall 23. The upper side wall 23 is provided with a gas outflow opening 25 for allowing hydrogen originating from a reaction mixture, comprising formic acid and a catalyst, to exit the reaction chamber 5 via the gas outflow opening 25. Exiting of the hydrogen from the reaction chamber 5 may be restricted by a pressure valve arrangement 31. The pressure valve arrangement 31 is arranged for controlling the internal pressure of the reaction chamber 5 by controllingly allowing the hydrogen gas stream originating from the reaction chamber 5 to pass the pressure valve arrangement 31. The lower side wall 27 comprises a mixture outflow opening 11 that is provided in a centre part of a bottom side of the reactor vessel 3.

The reactor vessel 3 is arranged for holding a reaction mixture of the catalyst, the formic acid and water in the reaction chamber 5. The reactor vessel 3 comprises a mixture inflow opening 9 for allowing the reaction mixture to enter the reaction chamber 5 via the mixture inflow opening 9. In the reaction chamber 5 a stationary flow organ 29 is provided at or near the reactor wall 7. The flow organ 29 extends along substantially the complete height of the reaction chamber 5. In an embodiment of the system 1 it is conceivable that the flow organ extends only along a lower half of the height of the reaction chamber 5.

The reactor vessel 3 is provided with a further inflow opening 21 that is arranged for introducing the formic acid, from a carrier reservoir 35, in the reactor vessel 3 for forming the reaction mixture. The carrier reservoir 35 is coupled for fluid flow to the reaction chamber 5 via a further pump 37. The further pump 37 is arranged for pumping the formic acid from the carrier reservoir 35 into the reaction chamber 5.

The reactor wall 7 comprises a plastic that is coated on a side of the plastic facing the reaction chamber 5 with polytetrafluoroethylene for thermally insulating the reactor vessel 13 and shielding the reaction mixture from the plastic of the reactor wall 7 that may otherwise degrade the catalyst present in the reaction chamber 5. The reactor wall 7 further comprises a replaceable wall element 33. The replaceable wall element 33 comprises a metal for locally reinforcing the reactor wall 7. The replaceable wall element 33 is coated on a side of the replaceable wall element 33 facing the reaction chamber 5 with polytetrafluoroethylene for thermally insulating the reactor vessel 13 and shielding the reaction mixture from the metal of the replaceable wall element 33 that may otherwise degrade the catalyst present in the reaction chamber 5. In an embodiment of the system 1 it is conceivable that the reactor wall is locally reinforced by a fixed wall element in addition to, or as an alternative of, the replaceable wall element 33.

The inflow conduit 13 is communicatively coupled for fluid flow, via said mixture inflow opening 9, to said reaction chamber 5. The inflow conduit 13 is arranged such that said reaction mixture, in use, is introduced in said reaction chamber 5, via said mixture inflow opening 9, in a predetermined direction having a tangential component T for stirring 39, in use, said reaction mixture in said reaction chamber 5. In other words, the reaction mixture is introduced in a direction along the reactor wall 7, wherein said direction of introduction has the tangential component T.

The pump 15 is communicatively coupled for fluid flow, via the mixture inflow opening 9 and the mixture outflow opening 11, to the reaction chamber 5. The pump 15 is arranged for withdrawing, via the mixture outlet opening 11, the mixture from the reaction chamber 5 and introducing, via the inflow conduit 13 and the inflow opening 9, the mixture into the reaction chamber 5.

The temperature control arrangement 17 is communicatively coupled for fluid flow to said pump 15 and arranged for heating and/or cooling the reaction mixture withdrawn from the reaction chamber 5. The temperature control arrangement 17 is further arranged for cooling and/or heating a part of the reaction mixture present in the temperature control arrangement 17 to be cooled and/or heated to a predetermined temperature in the range of 70 to 150 degrees Celsius before introducing, via the inflow conduit 13, the part of the reaction mixture into said reaction chamber 5.

The system 1 comprises a control unit 41, a measurement unit 43 and a humidity determining unit 45. The control unit 41 is communicatively coupled to said temperature control arrangement 17, the pump 15 and the measurement unit 43. The control unit 41 is arranged for controlling the temperature control arrangement 17 and the pump 15 in dependence of a temperature of the reaction mixture, in use present in the reaction chamber 5 and/or the temperature control arrangement 17, measured by the measurement unit 43.

The system 1 further comprises a water providing means for providing $H_2O$ to the reaction chamber 5. The water providing means may be embodied as a gas supply unit arranged for providing a gas stream comprising water vapour to the reaction chamber 5. The water providing means may be embodied as a water supply unit arranged for providing a liquid stream comprising water to the reaction chamber 5. The control unit 41 is arranged to control said gas supply unit and/or said water supply unit to controllably supply water to the reaction chamber 5. Alternatively or additionally, the system 1 the carrier reservoir 35 stores a formic acid composition comprising the formic acid and water at a certain concentration. The supply of the formic acid composition including water to the reaction chamber 5 is used as water providing means. Thus, by controlling the pump 37 the supply of formic acid and the supply of water to the reaction chamber is controlled.

The system 1 further comprises a water vapour control means arranged for controlling the water vapour level in the reaction chamber, in response to the determined humidity level. The water vapour control means may comprise the pressure valve arrangement 31 for controlling the internal gas pressure of the reaction chamber and the temperature control arrangement 17 for controlling the reaction temperature of the reaction chamber. In particular, the water vapour control means further comprises the control unit 41 to control said pressure valve arrangement 31 and temperature control arrangement 17 to control the water vapour level in the reaction chamber.

Method 101 is arranged for hydrogen production by converting a hydrogen carrier substance, such as by dehydrogenation of formic acid. The method 101 comprises the step of providing said formic acid 103 into said reaction chamber 5. Additionally, the method 101 comprises the step of providing water 105 into said reaction chamber 5.

In an embodiment of the method 101, said providing of said water 105 and said formic acid 103 may be executed in one step 104 when the formic acid stream is a formic acid mixture, which contains formic acid and a predetermine concentration water. In an alternative or additional embodiment of the method 101, said providing of said water may be executed in step 105 independently of the step of providing said formic acid 103 into said reaction chamber 5. In other words the formic acid and the water may be provided in said reaction chamber during different steps, to allow said formic acid 103 and said water 105 to be stored separately and to be supplied independently to the reaction chamber 5.

The step of providing of said water step 105 may be embodied by a gas supply unit, which supplies a gas stream comprising water vapour to the reaction chamber; and may be embodied by a water supply unit which supplies a liquid stream comprising water to the reaction chamber. In specific embodiment, both gas supply unit and water supply unit may be used to supply water to the reaction chamber 5.

In another embodiment, a step of providing of said water step 105 may be combined with a step of providing water in the formic acid stream 104.

The method 101 further comprises a step 107 of converting the hydrogen carrier substance, such as by dehydrogenation of formic acid, thereby forming a gas stream comprising hydrogen. The $H_2$ gas stream exits the reaction space 5 via the gas outflow opening 25 to the output conduit 26.

The method 101 further comprises a step 109 of determining a humidity level of the $H_2$ gas stream by humidity determining unit 45. In an example, a humidity sensor is coupled to the output conduit 26 for measuring the humidity level of the $H_2$ gas stream. The humidity sensor sends a signal to the control unit 41 indicating the humidity level of the $H_2$ gas stream.

In another example, a surface level sensor is provided at the reaction chamber 5 and is arranged to measure the liquid surface level of the reaction mixture in the reaction chamber 5. The humidity determining unit 45 determines the humidity level of the $H_2$ gas stream based on the measured surface level (height). The operation of the surface level sensor is further explained below in the examples section.

The method 101 further comprises a step 111 of controlling, in response to a signal of the humidity determining unit 45 provided to the control unit 41, at least one of an internal gas pressure of the reaction chamber and a reaction temperature of the reaction chamber in order to control the humidity level of the $H_2$ gas stream. Thus, step 111 may comprise a step of controlling the internal gas pressure of the reaction chamber 111a and may comprise a step of controlling the reaction temperature of the reaction chamber 111b, or may comprise a combination of step 111a and step 111b. The control unit 41 may decide which of the steps 111a, 111b is used in any combination. Specifically, the control unit 41 may select the steps 111a and 111b depending on other desired attributes of the $H_2$ gas stream, such as hydrogen production flow rate, and on attributes of the reaction chamber and reaction mixture, such as operating temperatures of the reaction chamber.

In example, the internal gas pressure of the reaction chamber is controlled by the pressure valve arrangement 31. The pressure valve arrangement 31 is controlled by the control unit 41 to control, if needed to adjust, the actual internal gas pressure to be a target internal gas pressure. The target internal gas pressure of the reaction chamber is determined by the control unit 41 and is selected to control the humidity level of the $H_2$ gas stream.

Alternatively, the internal gas pressure of the reaction chamber may be controlled in any other suitable way to control the humidity level of the $H_2$ gas stream.

In an example, the reaction temperature of the reaction mixture in the reaction chamber 5 is controlled by the temperature control arrangement 17 as indicated above. The temperature control arrangement 17 is controlled by the control unit 41 to control, if needed to adjust, the reaction temperature to be a target reaction temperature. The target reaction temperature of the reaction chamber is determined by the control unit 41 and is selected to control the humidity level of the $H_2$ gas stream.

In this example, step 111b may comprises a step 205 of withdrawing, by said pump 15, said provided catalyst and said formic acid from said reaction chamber 5. Subsequently, said reaction mixture, withdrawn during said step 205, is heated and/or cooled, during a step 207 of heating and/or cooling, by said temperature control arrangement 17, to said target reaction temperature. As said, said target reaction temperature is determined by the control unit and is selected to control the humidity level of the $H_2$ gas stream.

After said heating and/or cooling during said step 207, said heated and/or cooled mixture is introduced, during a step 209 of introducing, via said inlet opening 9, into said reaction chamber 5. During the step 209 of introducing, the mixture is introduced into the reaction chamber 5 in the predetermined direction having the tangential component T for stirring 39, in use, said mixture in said reaction chamber 5. In other words, the mixture is introduced in a direction along the reactor wall 7, wherein said direction of introduction has the tangential component T.

Alternatively, the reaction temperature of the reaction mixture may be controlled in any other suitable way to control the humidity level of the $H_2$ gas stream.

In a specific example, the reaction mixture inside the reaction chamber 5 comprises a catalyst comprising a complex of the formula $$M(L)_n \qquad \text{(I)}$$

in which,

M is a metal selected from Ru, Rh, Ir, Pt, Pd, and Os, preferably Ru;

n is in the range of 1-4;

L is a carbene, or a ligand comprising at least one phosphorus atom, said phosphor atom being bound by a complex bond to said metal, the phosphorus ligand further comprising at least an aromatic group and a hydrophilic group, wherein, if n>1, each L may be different from another L;

wherein the complex of formula (I) optionally comprises other ligands and is provided in the form of a salt or is neutral.

Figure 5:
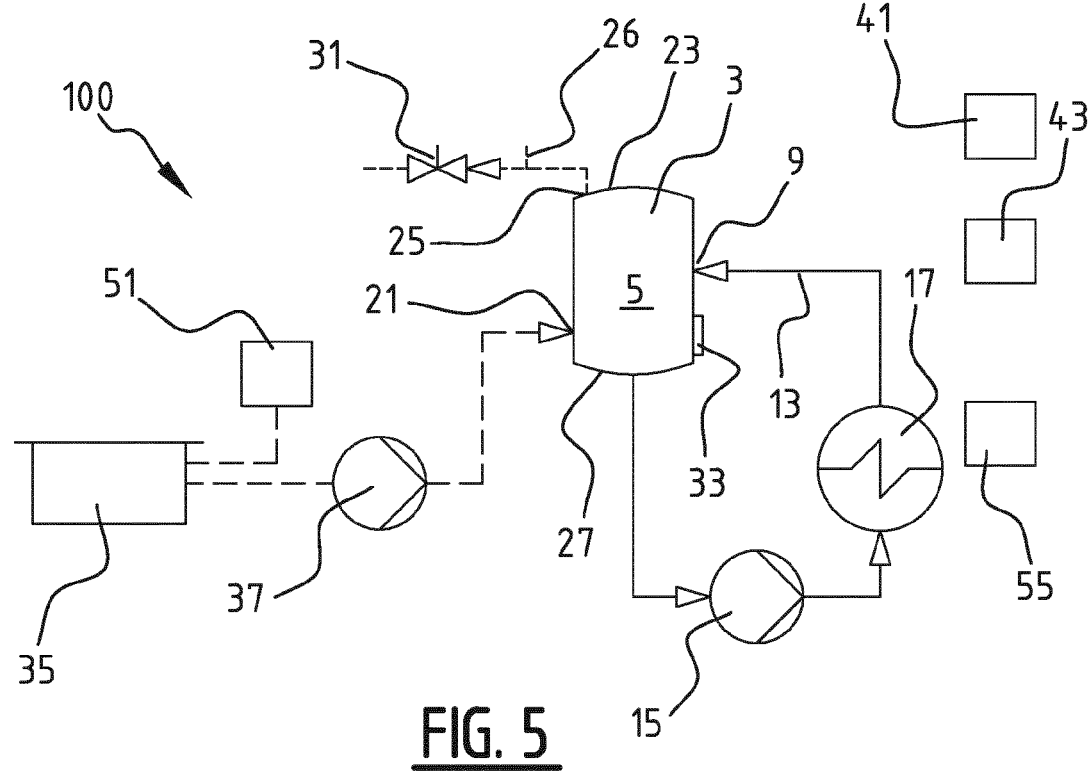
FIG. 5: another system according to the present disclosure is shown.

In FIG. 5 another system 100 is disclosed. The system 100 is based on system 1 and comprises the same components as system 1 shown in FIG. 1. The system 100 may in embodiments be with or without the humidity determining unit 45, the water providing means and the water vapour control means as described in relation to system 1.

The system 100 additionally comprises a freezing control unit 55 and a water supplying means 51 for supplying $H_2O$ to the carrier reservoir. The water supplying means 51 may be a water reservoir and a valve for controllably supplying water from the water reservoir to the carrier reservoir 35. The freezing control unit 55 is arranged for controlling the supply of water by the water supplying means 51 to the carrier reservoir in response to a measured ambient temperature.

The system 100 may further comprise an ambient temperature sensor for measuring the ambient temperature. In an example, in case the ambient temperature decreases below a threshold temperature, the freezing control unit 55 may select an amount of water to supply by the water supplying means 51 to the carrier reservoir.

The freezing control unit 55 may calculate, e.g. based on a determined volume of the formic acid mixture inside the carrier reservoir 35, how much water needs to be added to the carrier reservoir 35, to form a formic acid mixture having sufficient water concentration to prevent a freezing of the stored formic acid mixture. The freezing temperature of a formic acid mixture comprising water is generally known to a skilled person.

In embodiments, the freezing control unit 55 may be part of the control unit 41.

In embodiments, the system 100 further comprises a water concentration determining unit for determining a water concentration of a hydrogen carrier composition, containing the hydrogen carrier substance and an amount of water, inside the carrier reservoir 5.

In each of the embodiments disclosed in FIGS. 1-5, the system 1, 100 may additionally comprise a fuel cell arranged for producing electric energy by converting hydrogen, and wherein the output conduit 26 is arranged for supplying the $H_2$ gas stream from the reaction chamber 5 to the fuel cell. The $H_2$ gas stream is maintained at a temperature above a dew point of the $H_2$ gas stream between the reaction chamber 5 and the fuel cell in order to prevent a loss of water vapour from the $H_2$ gas stream.

The following, non-limiting examples are provided to illustrate the invention.

EXAMPLE

As an example of the present invention of operating the system 1, formic acid is supplied from the carrier reservoir 35 to the reaction chamber 5 at a flow rate of 0.73 l/minute. The reactor chamber 5 has a reaction temperature of 95 degrees Celsius and an internal pressure of 12 bar. The reaction temperature of 95 degrees Celsius and the internal pressure of 12 bar determine the water vapour level of the gas above the liquid reaction mixture inside the reaction chamber 5. At the same time the flow of water vapour exiting the reaction chamber is 2.03 kg/hr (at a water vapour level being a dew point of 95 degrees Celsius at 12 bars or a dew point of 39.17 degrees Celsius at 1 bar).

In case the reaction chamber 5 contains too much water, such as 2 liter water excess, then for a certain period, the reaction temperature is held 100 degrees Celsius and the internal pressure at 10 bar to provide a flow of water vapour exiting the reaction chamber of 2.88 kg/hr (at a water vapour level or dew point of 100 degrees Celsius at 10 bars or 46.14 degrees Celsius at 1 bar). The water vapour level is determined by the reaction temperature and the internal pressure under the condition that sufficient water is present in the reaction mixture to form the water vapour inside the reaction chamber at said conditions.

After a little more than 2 hours the 2 liter water excess has been removed from the reaction chamber.

This estimation is based on calculations of the vapour pressure in gas mixtures containing hydrogen gas and carbon dioxide gas (each 50 weight-%).

Stabilized Conditions

Relevant is the surface level of the reaction mixture inside the reaction chamber. This means that if the surface level increases, the amount of water entering the reaction chamber is higher then the amount of water that exits the reaction chamber. By increasing the reaction temperature or decreasing the internal pressure the surface level can be dropped.

The stabilized conditions presume that the supply flow of formic acid into the reaction chamber is equal to the conversion rate of the formic acid at said reaction conditions.

Output Values

For a system which converts formic acid and delivers the $H_2$ gas stream to a fuel cell, typical output values of the system are:

| $H_2$ gas stream | Minimum | Maximum |
|---|---|---|
| Gasflow | 0 slpm | 1000 slpm |
| $H_2$ output | 50% of volume | 50% of volume |
| Dew point level (at 1 bar) | 20 degrees Celsius | 90 degrees Celsius |
| T temperature | 20 degrees Celsius | 90 degrees Celsius |
| Pressure | 3 barg | 16 barg |

The dew point level of the $H_2$ gas stream is determined by the reaction temperature and the internal pressure of the reaction chamber.

Dynamic Processes

The first target is to achieve a constant surface level (meaning a constant water amount) in the reaction chamber. During a start-up condition, the reaction temperature is relatively low. Assumed is a constant supply of water using a formic acid composition having 99 weight-% formic acid and 1 weight-% of water. As such, the internal pressure needs to be kept low to prevent that the surface level in the reaction chamber raises during start-up condition above a certain threshold and/or a flow rate of supply of the formic acid composition is kept low during the start-up condition.

When the reaction chamber achieves operational temperatures (>60 degrees Celsius) then the control unit selects settings to achieve stabilized conditions.

The surface level (level height in the reactor) is monitored over time. If it changes over time, for example the surface level decreases, the reaction temperature should be lowered and the internal pressure should be increased. The operation window is in between 90-110 degrees Celsius and in between 5 and 16 barg internal pressure. This allows the system to achieve a Dew point level in between 40 and 90 degrees (at 1 bar). The temperature of the $H_2$ gas stream to a fuel cell is maintained above the Dew point level of the $H_2$ gas stream during transport to a fuel cell, to prevent any loss of water vapour during the transport to the fuel cell. Preferably, the $H_2$ gas stream has to be kept on at least 50 degrees Celsius on operational status to prevent any loss of water vapour.

The time it takes to reach stabilized conditions is depending on how much the surface level deviates from a desired surface level. Usually it may take from minutes up to some hours, depending of the volume of the reaction chamber and the start-up conditions (T, p) of the reaction chamber.

Water Concentration Determination of $H_2$ Gas Stream

This could be achieved by a humidity measurement in the $H_2$ gas stream before for example a fuel cell. Humidity sensors are commercial available. Another way of determining the humidity level is by measuring the temperature of the $H_2$ gas stream. This usually gives a good representation of the maximum dew point of the gas. If the output is thermally isolated from the reaction chamber, the dew point of the $H_2$ gas stream could be monitored with a simple temperature sensor.

A preferred way to determine the water concentration of $H_2$ gas stream is by using a surface level determining of the reaction mixture inside the reaction chamber. To determine a height of the surface level a floating element is used. Alternatively, a radar system may be used to determine the surface level in the reactor. Another option is to use temperature sensors in order to measure the surface level. At the interface between the gas and the fluid a temperature difference is present. This allows to place multiple temperature sensors in the wall of the reaction chamber and based on the temperature distribution in the reaction chamber it is possible to measure the height of the surface level.

If the surface level stays stable one can calculate based on the reaction temperature and the internal pressure how much water exits the reaction chamber and thus how much enters the reaction chamber.

Freezing Point Formic Acid Composition

The freezing point fp, of a formic acid composition containing formic acid and an amount of water is shown in the Table below:

TABLE

| freezing points of various formic acid - water mixtures | |
| --- | --- |
| Formic acid molar fraction, [%] | Fp, [degrees Celsius] |
| 100.0 | 8.3 |
| 80.0 | −5.6 |
| 69.5 | −13.0 |
| 59.0 | −23.2 |
| 50.0 | −35.3 |
| 41.0 | −48.5 |
| 37.0 | −43.0 |

Depending on the measured ambient temperature a molar fraction of water inside the formic acid composition containing formic acid and water may be adjusted to prevent freezing of the formic acid composition at said ambient temperature.

It should be appreciated by those skilled in the art that any block diagrams herein represent conceptual views of illustrative units or modules embodying the principles of the invention.

Whilst the principles of the invention have been set out above in connection with specific embodiments, it is to be understood that this description is merely made by way of example and not as a limitation of the scope of protection which is determined by the appended claims.

The invention claimed is:

1. A hydrogen generation electricity system for producing electricity from hydrogen using a hydrogen carrier substance, the system comprising:
   a reaction chamber arranged for generating a $H_2$ gas stream by converting the hydrogen carrier substance, wherein the reaction chamber comprises an inlet arranged for receiving the hydrogen carrier substance;
   an output conduit for exiting the $H_2$ gas stream from the reaction chamber;
   a fuel cell arranged for producing electric energy by converting hydrogen;
   a humidity determining unit arranged for determining a humidity level of the $H_2$ gas stream;
   a water providing means for providing $H_2O$ to the reaction chamber; and
   a water vapour control means arranged for controlling the water vapour level in the reaction chamber in response to the determined humidity level of the $H_2$ gas stream,
   wherein the output conduit is arranged for supplying the $H_2$ gas stream from the reaction chamber to the fuel cell, and
   wherein the generated $H_2$ gas stream comprises hydrogen and water vapour.

2. The hydrogen generation electricity system according to claim 1, wherein the water vapour control means is arranged to control the water vapour concentration of the $H_2$ gas stream by controlling, in response to the determined humidity level, at least one of an internal gas pressure of the reaction chamber and a reaction temperature of the reaction chamber to affect evaporation of water inside the reaction chamber in order to control the humidity level of the $H_2$ gas stream.

3. The hydrogen generation electricity system according to claim 1, wherein the hydrogen carrier substance is liquid at room temperature.

4. The hydrogen generation electricity system according to claim 1, wherein the water vapour control means comprises
   a pressure control unit for controlling the internal gas pressure of the reaction chamber,
   wherein optionally the water vapour control means comprises a central control unit to control said pressure control unit.

5. The hydrogen generation electricity system according to claim 4, wherein the pressure control unit comprises a pressure valve arranged at the output conduit of the H2 gas stream to control the internal gas pressure of the reaction chamber.

6. The hydrogen generation electricity system according to claim 1, wherein the water providing means comprises at least one of:
   a gas supply unit arranged for providing a gas stream comprising water vapour to the reaction chamber; and
   a water supply unit arranged for providing a liquid stream comprising water to the reaction chamber,
   wherein the system comprises a carrier reservoir for storing a hydrogen carrier composition comprising the hydrogen carrier substance and water, wherein the inlet of the reaction chamber is arranged for receiving the hydrogen carrier composition including water from the carrier reservoir.

7. The hydrogen generation electricity system according to claim 1, wherein the humidity determining unit comprises
a level sensor unit arranged for sensing a surface level of a liquid reaction mixture comprising the hydrogen carrier substance inside the reaction chamber, wherein the humidity determining unit is arranged to calculate the humidity level based on the measured surface level, wherein the humidity level is determined by the reaction temperature and the internal pressure under the condition that sufficient water is present in the reaction mixture to form the water vapour inside the reaction chamber at said conditions.

8. The hydrogen generation electricity system according to claim 1, wherein the system comprises a carrier reservoir for storing the hydrogen carrier substance, wherein the inlet of the reaction chamber is arranged for receiving the hydrogen carrier substance from the carrier reservoir.

9. The hydrogen generation electricity system according to claim 8, wherein the hydrogen carrier substance has a freezing temperature between 0 and 20 degrees Celsius, wherein the hydrogen generation system further comprises a freezing control unit for controlling a water supply to the carrier reservoir in response to a measured ambient temperature.

10. The hydrogen generation electricity system according to claim 9, wherein the hydrogen generation system further comprises a conduit for delivering the water supply to the carrier reservoir.

11. A method for operating an hydrogen generation electricity system according to claim 1, the method comprising the steps:
receiving in the hydrogen carrier substance in the reaction chamber;
receiving water in the reaction chamber;
generating the $H_2$ gas stream in the reaction chamber by converting the hydrogen carrier substance, wherein the $H_2$ gas stream comprises hydrogen and water vapour;
determining the humidity level of the $H_2$ gas stream by the humidity determining unit;
controlling, in response to the determined humidity level, the water vapour level inside the reaction chamber by the water vapour control means; and
producing electric energy by the fuel cell by converting hydrogen, which is supplied by the $H_2$ gas stream to the fuel cell.

12. The method of claim 11, wherein the water vapour controlling step comprises controlling at least one of an internal gas pressure of the reaction chamber and a reaction temperature of the reaction chamber to affect evaporation of the water received in the reaction chamber in order to control the humidity level of the $H_2$ gas stream.

13. The method of claim 11, wherein the water vapour control means controls the humidity level of the $H_2$ gas stream to be within a target vapour concentration range, wherein the target vapour concentration range is dew point range from 30 degrees Celsius to 60 degrees Celsius at 1 bar.

14. A hydrogen generation system for producing hydrogen using a hydrogen carrier substance, the system comprising:

a reaction chamber arranged for generating a $H_2$ gas stream by converting the hydrogen carrier substance, wherein the $H_2$ gas stream comprises hydrogen;
an output conduit for exiting the $H_2$ gas stream from the reaction chamber;
a humidity determining unit arranged for determining a humidity level of the H2 gas stream;
a water providing means for providing $H_2O$ to the reaction chamber; and
a water vapour control means arranged for controlling, in response to the determined humidity level, the water vapour level inside the reaction chamber, wherein the generated $H_2$ gas stream comprises hydrogen and water vapour and wherein the $H_2$ gas stream is suitable for fueling a fuel cell,
wherein the reaction chamber comprises an inlet arranged for receiving the hydrogen carrier substance.

15. A method for operating an hydrogen generation system according to claim 14, the method comprising the steps:
receiving the hydrogen carrier substance in the reaction chamber;
receiving water in the reaction chamber;
generating the $H_2$ gas stream in the reaction chamber by converting the hydrogen carrier substance, wherein the $H_2$ gas stream comprises hydrogen and water vapour;
determining the humidity level of the $H_2$ gas stream by the humidity determining unit; and
controlling, in response to the determined humidity level, the water vapour level inside the reaction chamber by the water vapour control means, and wherein the $H_2$ gas stream is suitable for fueling a fuel cell.

16. The hydrogen generation electricity system according to claim 3, wherein the hydrogen carrier substance is selected from formic acid and methanol and mixtures thereof.

17. The hydrogen generation electricity system according to claim 4, wherein the water vapour control means further comprises a temperature control unit for controlling the reaction temperature of the reaction chamber, wherein optionally the water vapour control means comprises the central control unit to control said temperature control unit.

18. The hydrogen generation electricity system according to claim 7, wherein the humidity determining unit further comprises a sensor arranged at the output conduit of the $H_2$ gas stream.

19. The hydrogen generation electricity system of claim 1, wherein the water vapour control means is configured to control the surface level of a liquid reaction mixture comprising the hydrogen carrier substance inside the reaction chamber to maintain said surface level within a predetermined height range.

20. The method of claim 12, comprising controlling, by the water vapour control means, the surface level of a liquid reaction mixture comprising the hydrogen carrier substance inside the reaction chamber to maintain said surface level within a predetermined height range.

* * * * *